(12) United States Patent
Wang et al.

(10) Patent No.: US 9,068,271 B2
(45) Date of Patent: Jun. 30, 2015

(54) ELECTROCHEMICAL NITRIDATION OF METAL SURFACES

(75) Inventors: Heli Wang, Littleton, CO (US); John A. Turner, Littleton, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 325 days.

(21) Appl. No.: 13/581,184

(22) PCT Filed: Mar. 3, 2010

(86) PCT No.: PCT/US2010/026111
§ 371 (c)(1),
(2), (4) Date: Aug. 24, 2012

(87) PCT Pub. No.: WO2011/109020
PCT Pub. Date: Sep. 9, 2011

(65) Prior Publication Data
US 2012/0325673 A1    Dec. 27, 2012

(51) Int. Cl.
| | |
|---|---|
| C25D 11/00 | (2006.01) |
| C23C 8/48 | (2006.01) |
| C23C 8/50 | (2006.01) |
| C25D 11/02 | (2006.01) |
| H01M 8/02 | (2006.01) |
| H01M 8/10 | (2006.01) |

(52) U.S. Cl.
CPC . *C25D 11/00* (2013.01); *C23C 8/48* (2013.01); *C23C 8/50* (2013.01); *C25D 11/02* (2013.01); *H01M 8/021* (2013.01); *H01M 8/0215* (2013.01); *H01M 8/0228* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 5,122,247 | A  * | 6/1992 | Kokado et al. | 204/484 |
| 7,247,403 | B2 * | 7/2007 | Brady et al. | 429/479 |
| 2005/0238873 | A1 | 10/2005 | Brady et al. | |

OTHER PUBLICATIONS

Wang et al, Electrochemical Nitridation of a stainless steel for PEMFC bipolar plates, Internation Journal of Hydrogen Energy, vol. 36, No. 20, Oct. 2011, pp. 13008-13013.*
Griffiths et al., "Low temperature electrochemical synthesis of titanium nitride", Chemical Communications, 2001, pp. 579-580.
Ito et al., "Non-conventional electrolytes for electrochemical applications", Electrochimica Acta, 2000, vol. 45, pp. 2611-2622.
Kim et al., "On the question of nitrate formation by N-containing austenitic stainless steels", Materials Science and Engineering, 1994, A186, pp. 163-169.
Tsujimura et al., "Electrochemical surface nitriding of SUS 430 ferritic stainless steel", Materials Science and Engineering A355, 2003, pp. 315-319.

(Continued)

*Primary Examiner* — Harry D Wilkins, III
(74) *Attorney, Agent, or Firm* — John C. Stolpa; Michael A. McIntyre

(57) ABSTRACT

Electrochemical nitridation of metals and the produced metals are disclosed. An exemplary method of electrochemical nitridation of metals comprises providing an electrochemical solution at low temperature. The method also comprises providing a three-electrode potentiostat system. The method also comprises stabilizing the three-electrode potentiostat system at open circuit potential. The method also comprises applying a cathodic potential to a metal.

15 Claims, 13 Drawing Sheets

(56) References Cited

OTHER PUBLICATIONS

Wade et al., "Electrochemical Synthesis of Ceramic Materials. 5. An Electrochemical Method Suitable for the Preparation of Nine Metal Nitrides", Chemistry of Materials, 1997, vol. 9, No. 1, pp. 248-254.

Wang et al., "Stainless steel as bipolar plate material for polymer electrolyte membrane fuel cells", Journal of Power Sources, 2003, vol. 115, pp. 243-251.

Wang et al., "Ferritic stainless steels as bipolar plate material for polymer electrolyte membrane fuel cells", Journal of Power Sources, 2004, vol. 128, pp. 193-200.

Wang et al., "Thermally nitrided stainless steels for polymer electrolyte membrane fuel cell bipolar plates Part 1: Model Ni-50Cr and austenitic 349™alloys", Journal of Power Sources, 2004, Vol. 138, pp. 86-93.

Wang et al., "Thermally nitrided stainless steels for polymer electrolyte membrane fuel cell bipolar plates Part 2: Beneficial modication of passive layer on AlSl446", Journal of Power Sources, 2004, vol. 138, pp. 79-85.

Willenbruch et al., "An XPS and Electrochemical Study of the Influence of Molybdenum and Nitrogen on the Passivity of Austenitic Stainless Steel", Department of Materials Science and Engineering State University of New York at Stony Brook, Oct. 1989, Office of Naval Research USN 0001489J1068, pp. 1-10.

Willenbruch et al., "An XPS and Electrochemical Study of the Influence of Molybdenum and Nitrogen on the Passivity of Austenitic Stainless Steel", Corrosion Science, 1990, vol. 31, pp. 179-190.

International Search Report and Written Opinion for International (PCT) Application No. PCT/US2010/026111, mailed Dec. 6, 2010, pp. 1-8.

* cited by examiner

ELECTROCHEMICAL NITRIDATION OF METAL SURFACES

CONTRACTUAL ORIGIN

The United States Government has rights in this invention under Contract No. DE-AC36-08G028308 between the United States Department of Energy and the Alliance for Sustainable Energy, LLC, the Manager and Operator of the National Renewable Energy Laboratory.

CROSS-REFERENCE TO RELATED APPLICATIONS

This application is a national stage entry of International Application No. PCT/US10/26111, filed Mar. 3, 2010, the contents of which are incorporated by reference in their entirety.

TECHNICAL FIELD

The described subject matter relates to electrochemical nitridation of metal surfaces.

BACKGROUND

Surface modification employs different chemical reactions to produce improved properties and structures of the materials. Nitridation is a process to form nitrides on metal substrates, usually a hard surface of metal nitrides. This process has been widely used to improve mechanical properties and corrosion resistance of iron and steels. However, due to the kinetics of the nitride formation, the nitridation process normally operates at high temperature (typically over 550° C.) for a long period of time (about 8 to 16 hours), which may degrade the substrate materials. The enhancement of plasma source and ion implantation can decrease the operating temperature to about 300 to about 400° C. for stainless steels. Nitridation has also been made by ion implantation at room temperature with doses on the order of about $2.5 \times 10^{16}$ to about $2.0 \times 10^{17}$ $N_2^+/cm^2$. Although these methods modify the steels surface, significant drawbacks are the high cost associated with the vacuum equipment and high temperature needed for promoting the chemical gas reaction.

Stainless steels have good mechanical strength, high chemical stability, are suitable for mass production, offer a wide range of choices, and at relatively low cost. In these respects, the material is widely accepted as a polymer electrolyte membrane fuel cell (PEMFC) bipolar plate candidate. Ferrite and duplex stainless steels are available at low cost and stainless steels such as AISI446 and 2205 steels are also good candidates for PEMFC bipolar plates. The American Iron and Steel Institute (AISI) naming system is one of the most widely accepted systems for designating the various compositions of steels. AISI is a not-for-profit trade association that serves as the voice of the North American steel industry in the public policy arena and advances the case for steel in the marketplace as the material of choice.

The drawback of using stainless steel bipolar plates is the higher interfacial contact resistances due to surface oxide films. These surface films provide protection for the base material from corrosion in PEMFC environments. However, the high resistance of the film also decreases the surface electrical conductivity and renders the stainless steel unusable. Thermally nitrided AISI446 steel may be used in which a discontinuous mixture of nitrides and oxide is formed that provide excellent interfacial conductivity while maintaining good corrosion resistance of the metal. Nitrogen is incorporated into the naturally occurring oxide layer on the surface of the metal. However, the processing and associated costs of high temperature during thermal nitridation represents significant drawbacks. Consequently, there is a need for a low-cost surface nitridation process for stainless steel which exhibits properties similar to thermally nitrided steels.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Room temperature electrochemical nitridation provides an economical way to modify metal surfaces. Exemplary embodiments disclose a process for which metals (e.g., stainless steel) are electrochemically nitrided at low temperature and the surface thus treated showed very low interfacial contact resistance (ICR) and excellent corrosion resistance in simulated polymer electrolyte membrane fuel cell (PEMFC) environments. X-ray photoelectron spectroscopy (XPS) analysis indicated that the metal surface is modified with a nitride layer on the order of several nanometers thick. After polarization in PEMFC environments, the nitride layer is still present on the surface.

Exemplary embodiments describe that metal (e.g., stainless steel) samples were polished using #600 SiC abrasive paper, rinsed with acetone and dried with nitrogen gas. Exemplary electrochemical nitridation methods were carried out using 0.5 M $KNO_3$ solutions of pH1 at room temperature. A conventional three-electrode system, including a saturated calomel electrode (SCE) as reference and a platinum sheet as counter electrode, was controlled by a potentiostat. After stabilizing the system with an open circuit potential for less than 10 minutes, a cathodic potential was applied to the sample for about 0.5 to 8 h (hours). The applied potentials were on the order of about −0.7 V to about −1 V.

Exemplary embodiments describe methods for producing room temperature, cost-effective electrochemical nitridation of stainless steel which results in a nitrogen incorporated oxide film having a low interfacial contact resistance and excellent corrosion resistance. The electrochemical nitridation procedure is cost-effective and simple to deploy at room temperature.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Briefly, embodiments for producing low temperature (in the range of 0° C. to 100° C.) electrochemical nitridation (EN) of metals (e.g., self-passivating alloys such as but not limited to steels, and in particular, stainless steels) resulting in low interfacial contact resistance and excellent corrosion resistance are disclosed. Self-passivating metals contain elements which can react with oxygen to form surface oxides (e.g., such as the oxides of, but not limited to, Cr, Al, Ti, etc.) These surface oxide layers are relatively inert and prevent further corrosion of the underlying metal. Exemplary embodiments are disclosed herein for electrochemical nitridation at room temperature to provide an economical way to treat the stainless steel surfaces. Exemplary embodiments provide for stainless steel surfaces which have very low interfacial contact resistance and improved corrosion resistance in simulated polymer electrolyte membrane fuel cell (PEMFC) environments. Exemplary embodiments and methods of production thereof may be better understood with reference to the Figures and following discussion.

Figure 1:
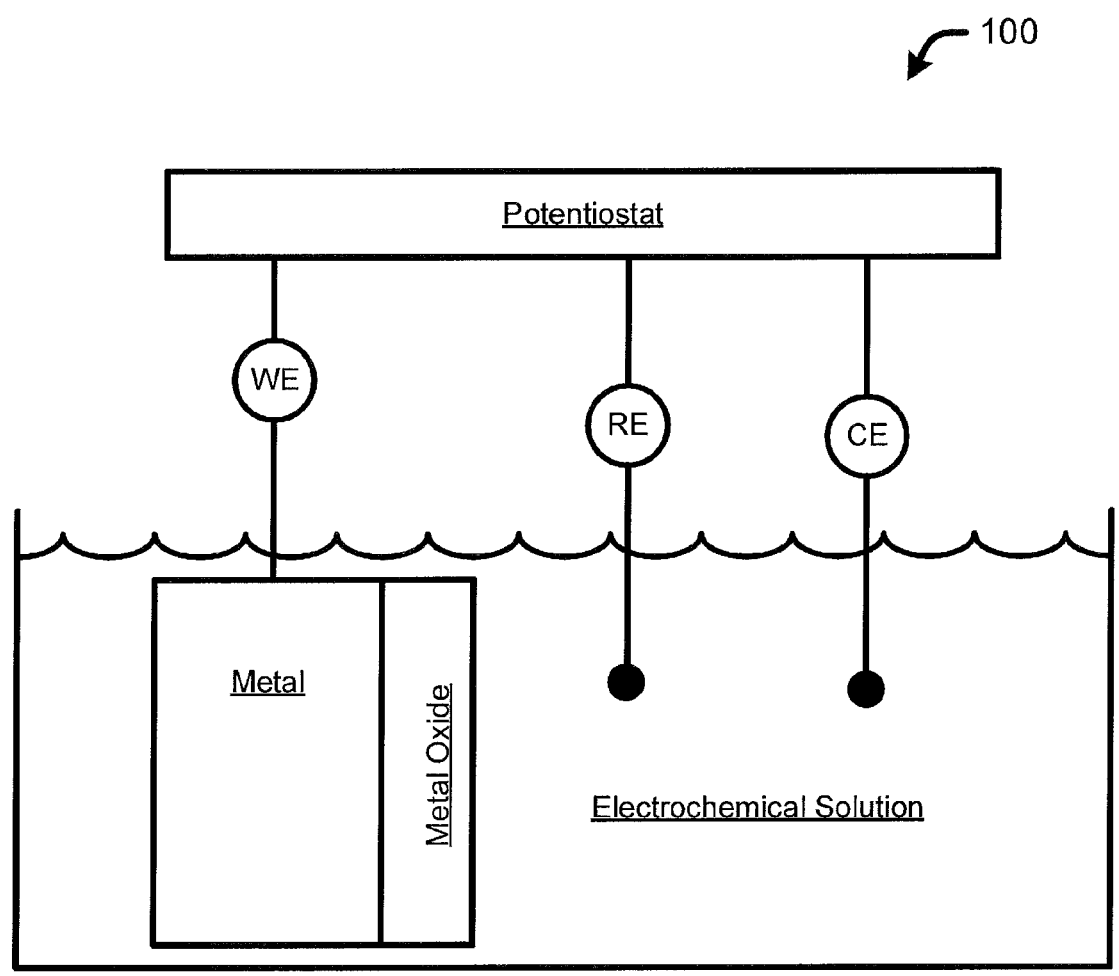
FIG. 1 is a high-level schematic drawing of an exemplary electrochemical nitridation (EN) system.

FIG. 1 is a high-level schematic drawing of an exemplary electrochemical nitridation (EN) system 100. The system 100 for electrochemical nitridation of metals comprises an electrochemical solution provided at low temperature. The system also comprises a three-electrode potentiostat system with working electrode (WE), reference electrode (RE) and counterelectrode (CE). The three-electrode potentiostat system is stabilized at open circuit potential. The system also comprises a cathodic potential applied to a metal (not shown). The system will now be described in more detail with reference to specific embodiments and examples.

Type AISI446 stainless steel plates were provided by Allegheny Ludlum Co. The chemical composition, in weight percentage, of the tested steel was Fe-28Cr-3Ni-3.5Mo. Steel plates were cut into 2.54×1.27 cm (centimeter) samples. The samples were then polished up to #600 SiC abrasive paper, rinsed with acetone and dried with nitrogen gas.

Exemplary electrochemical nitridation (EN) processes may be carried out at room temperature in solutions of 0.5 M $KNO_3$ adjusted to a pH of 1 using nitric acid. The electrochemical solution can be replaced with other $NO_3^-$ bearing solutions of $HNO_3$, $NaNO_3$, $NH_4NO_3$, $Mg(NO_3)_2$ or even other $NO_3^-$ bearing solutions known to those skilled in the art. The pH of the solution may be in the range of about 0 to 3. Drops of surfactant were added into the solution. A three-electrode system, in which a bare steel sample may be used as the working electrode, a saturated calomel electrode (SCE) may be used as a reference and a platinum sheet may serve as a counter electrode, was used in the EN process. All potentials are referred to SCE unless otherwise specified. A Solartron 1287 potentiostat, controlled by a computer, was used to carry out the EN. In this process, the sample is stabilized at open circuit potential (OCP) for about 5 minutes and then a specific cathodic potential is applied for a various durations, and currents are recorded. For purposes of illustration, the applied potentials may be −0.7V, −0.8V, −0.9V and −1V. Samples subjected to EN may be washed with de-ionized (DI) water, rinsed with acetone and dried in nitrogen gas. The samples are subsequently stored for interfacial contact resistance (ICR) measurements and for corrosion resistance tests in simulated PEMFC environments. In the latter case, samples may be fabricated into electrodes.

To simulate the aggressive PEMFC environment, all electrochemical testing may be carried out using 1 M $H_2SO_4$+2 ppm $F^-$ solutions at 70° C. The solution temperature may be controlled by a thermal bath using silicone fluid. The solution may be purged either with hydrogen gas (to simulate a PEMFC anode environment) or with pressured air (to simulate a PEMFC cathode environment) prior to and during the measurements.

Again, a conventional three-electrode system, including an SCE reference and a platinum sheet counter, may be used for the electrochemical measurements. A computer-controlled Solartron 1287 may be used to carry out the measurements. During the dynamic polarization, the electrode may be stabilized at an open circuit potential (OCP) for 5 minutes. Then the potential may be scanned from OCP to the anodic direction with a rate of 1 mV/s. In potentiostatic polarization, the electrode may also be stabilized for about 5 minutes, and then a specific potential may be applied and current recorded. In general, after stabilizing the system with an open circuit potential for less than 10 minutes, a cathodic potential is applied to the sample for about 0.5 to 8 h (hours).

All ICR measurements may be carried out at room temperature with dry samples. In short, two pieces of carbon papers may be sandwiched between the stainless steel sample and the two copper plates. A current of about 1 A (amp) was provided via two copper plates and the total voltage drop registers as the compaction forces are gradually increased. The total resistance dependency on the compaction force may then be calculated. The ICR value of the carbon paper/copper plate interface ($R_{C/Cu}$) may be deducted by a calibration. Only the corrected ICR values for the carbon paper/stainless steel interface ($R_{C/SS}$) are reported.

X-ray photoelectron spectroscopy (XPS) may be used to characterize the nitrided surface as well as the surface film after polarization in PEMFC environments. Measurements may be carried out in a Phi 5600 electron spectrometer using Al Kα radiation X-ray source (1486.6 eV) and a hemispherical energy analyzer. The base pressure in the spectrometer chamber was $1.33 \times 10^4$ Pa. The depth profiles may be obtained by sputtering the samples with 3 keV argon ions. During the sputtering, the pressure in the chamber was $6.67 \times 10^{-5}$ Pascals (Pa). Due to the roughness of the sample surface, the XPS analysis gives qualitative analysis about the surfaces. A sputtering rate of 35 Å/min may be used.

Air-generated oxide films on the metal are not a significant concern for PEMFC bipolar plate applications. Therefore, all the EN treatments may be carried out at room temperature in normal atmosphere.

Figure 2:
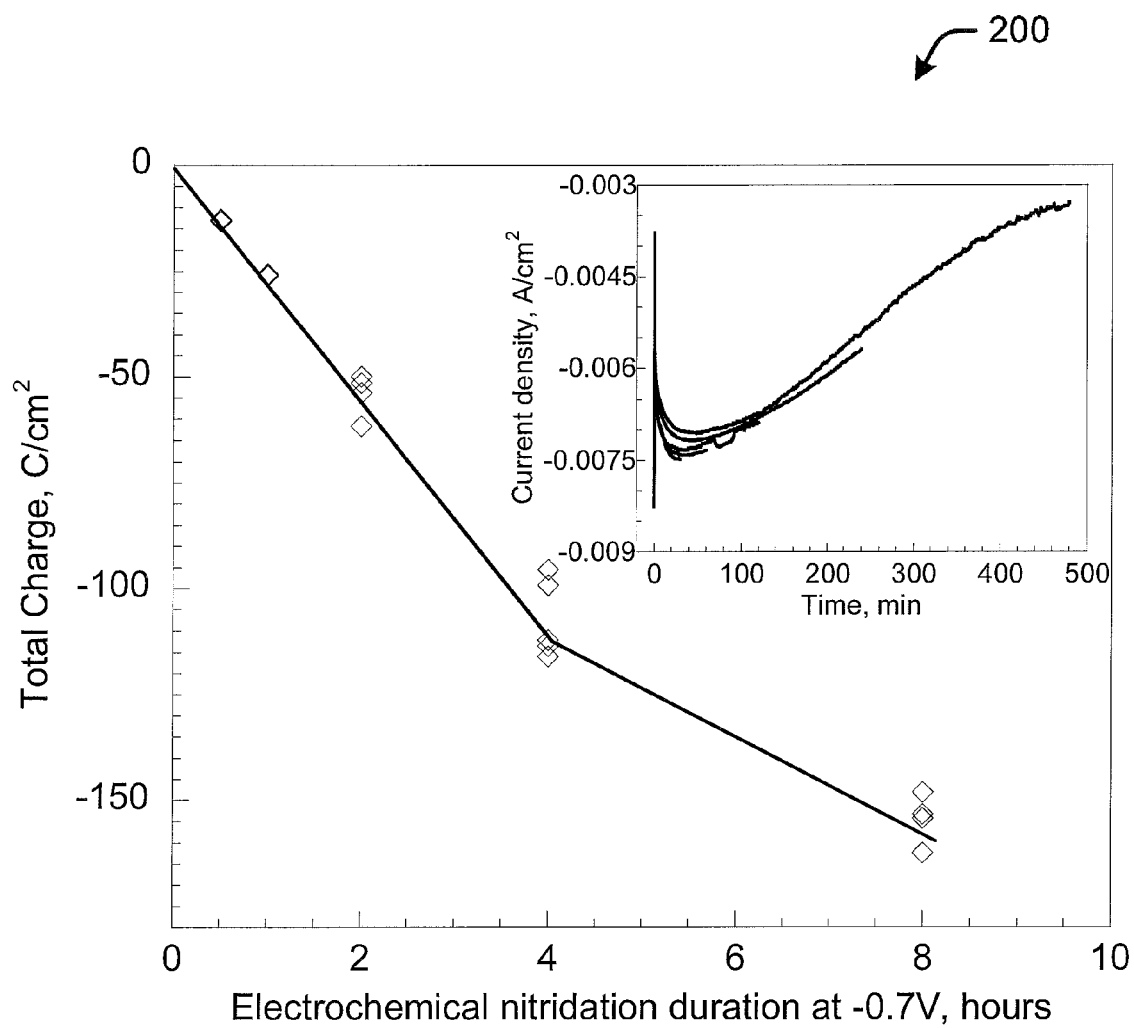
FIG. 2 is a plot of total charge versus electrochemical nitridation (EN) duration and shows the total charge used for AISI446 steel during the electrochemical nitridation process. The inset shows the current registered during the EN process.

The inset of FIG. 2 shows several current decays during an exemplary EN process. There is a sharp current spike as soon as −0.7 V is applied. A cathodic current peak is registered at around about 30 minutes polarization for all of the tests, followed by a steady decay. The plot 200 in FIG. 2 shows that the total charge is almost linear with time until about 4 h processing, when the charge levels out.

Since the electrolyte used for EN was acidic, and −0.7 V is rather negative, hydrogen evolution is one of the important reactions on the metal surface. Therefore, part of the current registered in FIG. 2 is related to hydrogen evolution.

Figure 3:
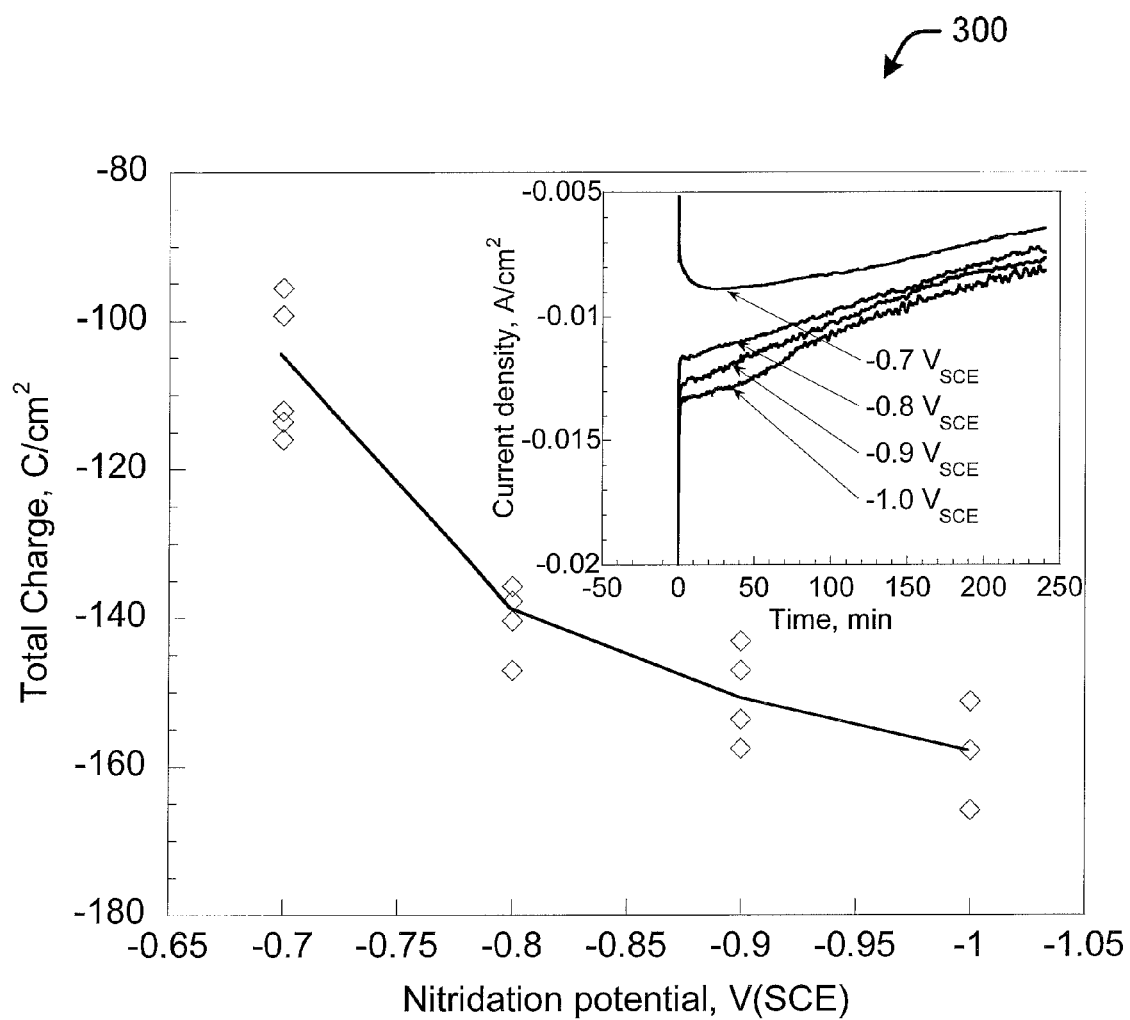
FIG. 3 illustrates the influence of nitridation potential on the total charge used for the 4 h (hours) electrochemical nitridation (EN) of AISI446 stainless steel. The inset shows the current registered with different applied potentials.

FIG. 3 is a plot 300 showing the influence of the applied potential on the charge during the EN process. More negative potential generates more cathodic charge.

Figure 4:
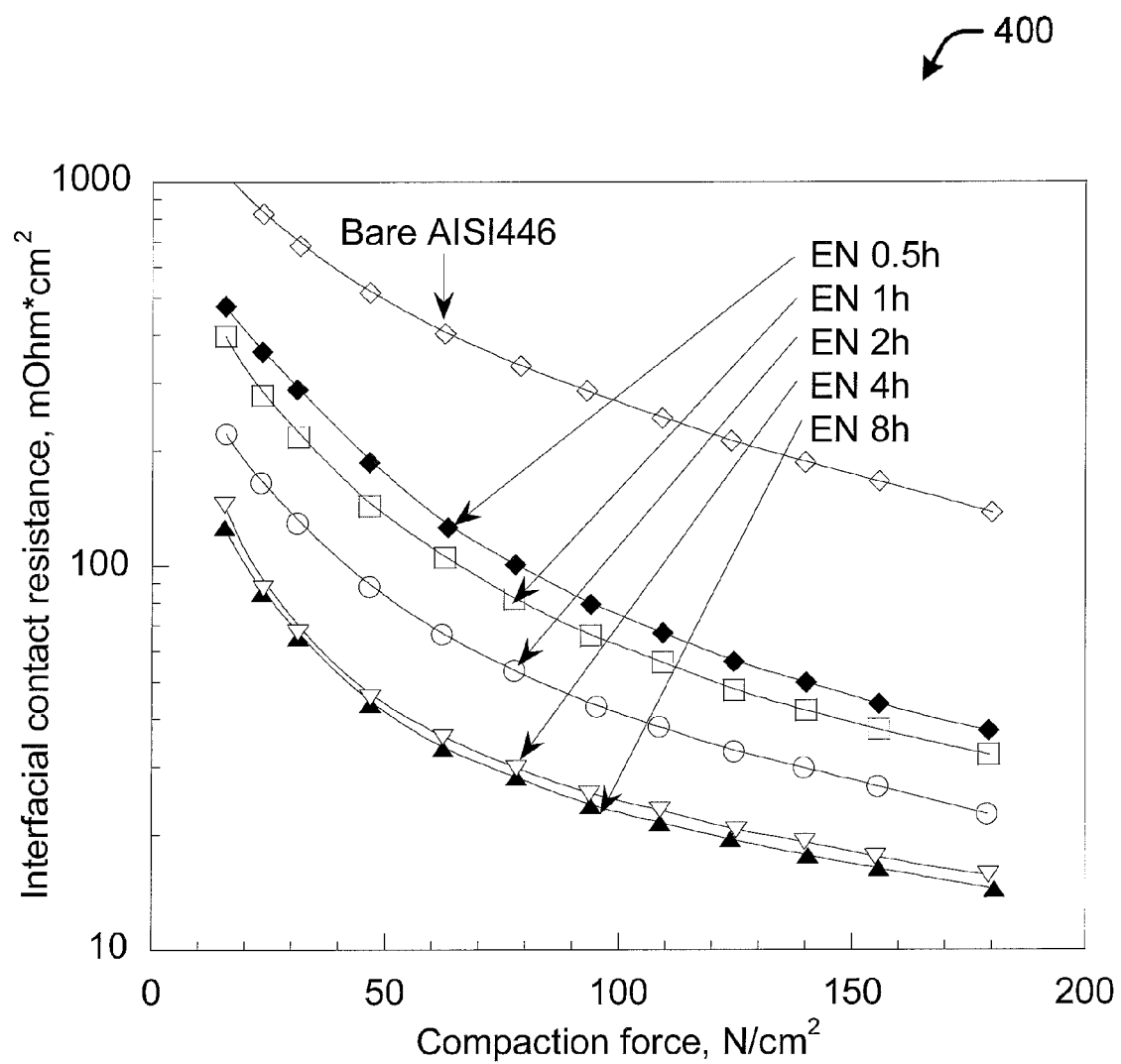
FIG. 4 is a plot of interfacial contact resistance (ICR) versus compaction force and shows interfacial contact resistance of AISI446 steel electrochemically nitrided for different processing times at about −0.7 V. The ICR values for bare (untreated) AISI446 steel are plotted for comparison.
Figure 5:
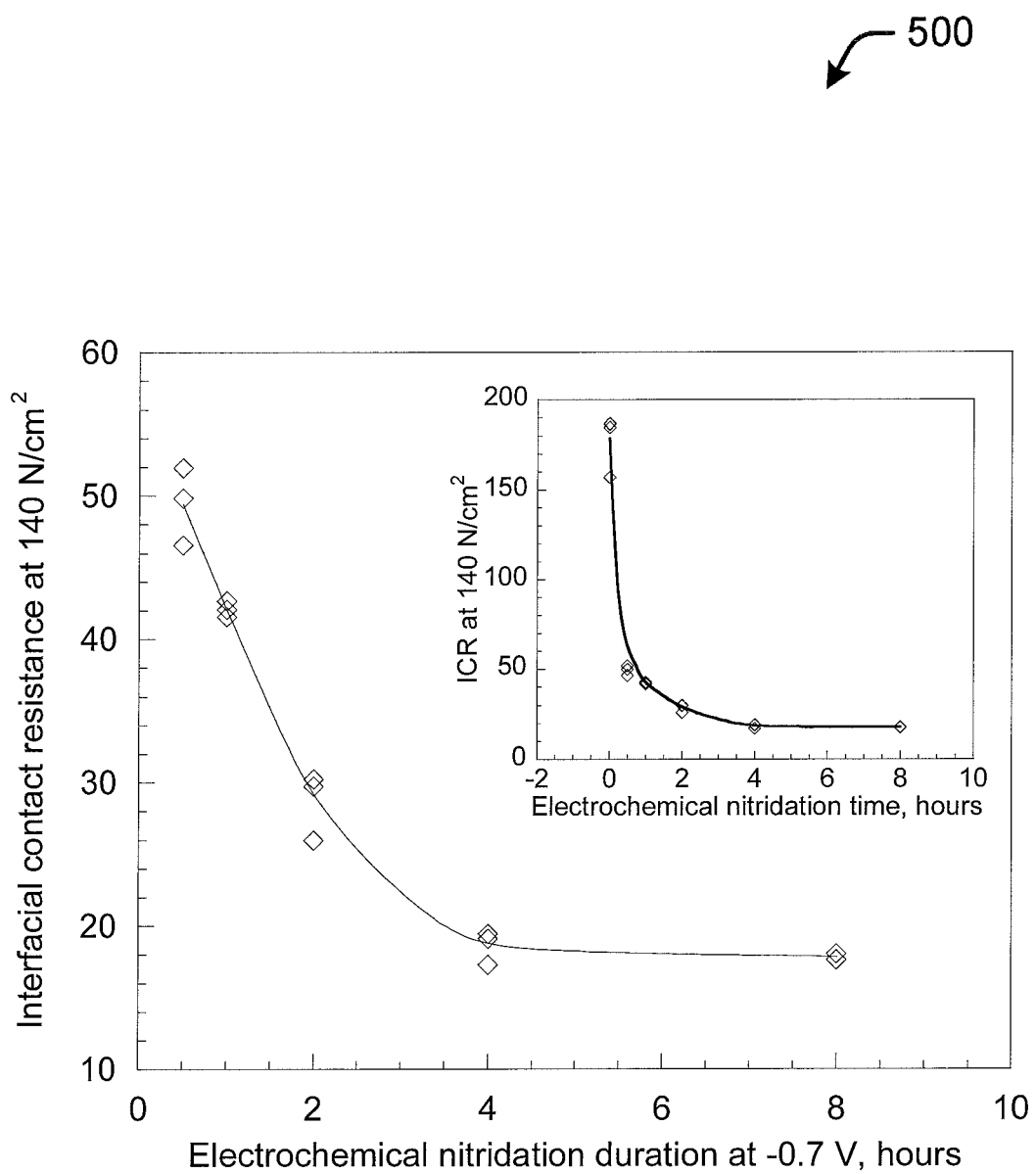
FIG. 5 shows the influence of the electrochemical nitridation duration at −0.7V on the ICR at a compaction force of about 140 N/cm$^2$. The inset also shows the ICR of bare AISI446 steel at 140 N/cm$^2$.

The ICRs for AISI446 steel electrochemically nitrided for different periods of time at −0.7 V are illustrated in the plot 400 of FIG. 4; ICR values for bare AISI446 are also shown for comparison. It is noted that EN has a significant impact on the ICR of the metal. Even EN for a half hour has decreased the ICR of the bare steel. ICRs of the electrochemically nitrided AISI446 decrease with the nitridation time. The longer the nitridation time, the lower the ICRs. This trend is valid until 4 h of processing time. Further increasing the processing time shows little influence on the ICR, indicating a saturation stage is reached. The plot 400 in FIG. 4 show that the ICRs already decrease by an order of magnitude after 4 h of nitridation. The ICR saturation behavior is more evident in the plot 500 of FIG. 5. The ICR decreases sharply due to the EN, as shown in the inset of FIG. 5. Then ICR decreases gradually with the processing time. ICR reaches a stable value after about 4 h nitridation. Further extending the processing time shows little impact on the ICR. The stable ICR at 140 N/cm$^2$ is about 18 mΩ·cm$^2$.

Figure 6:
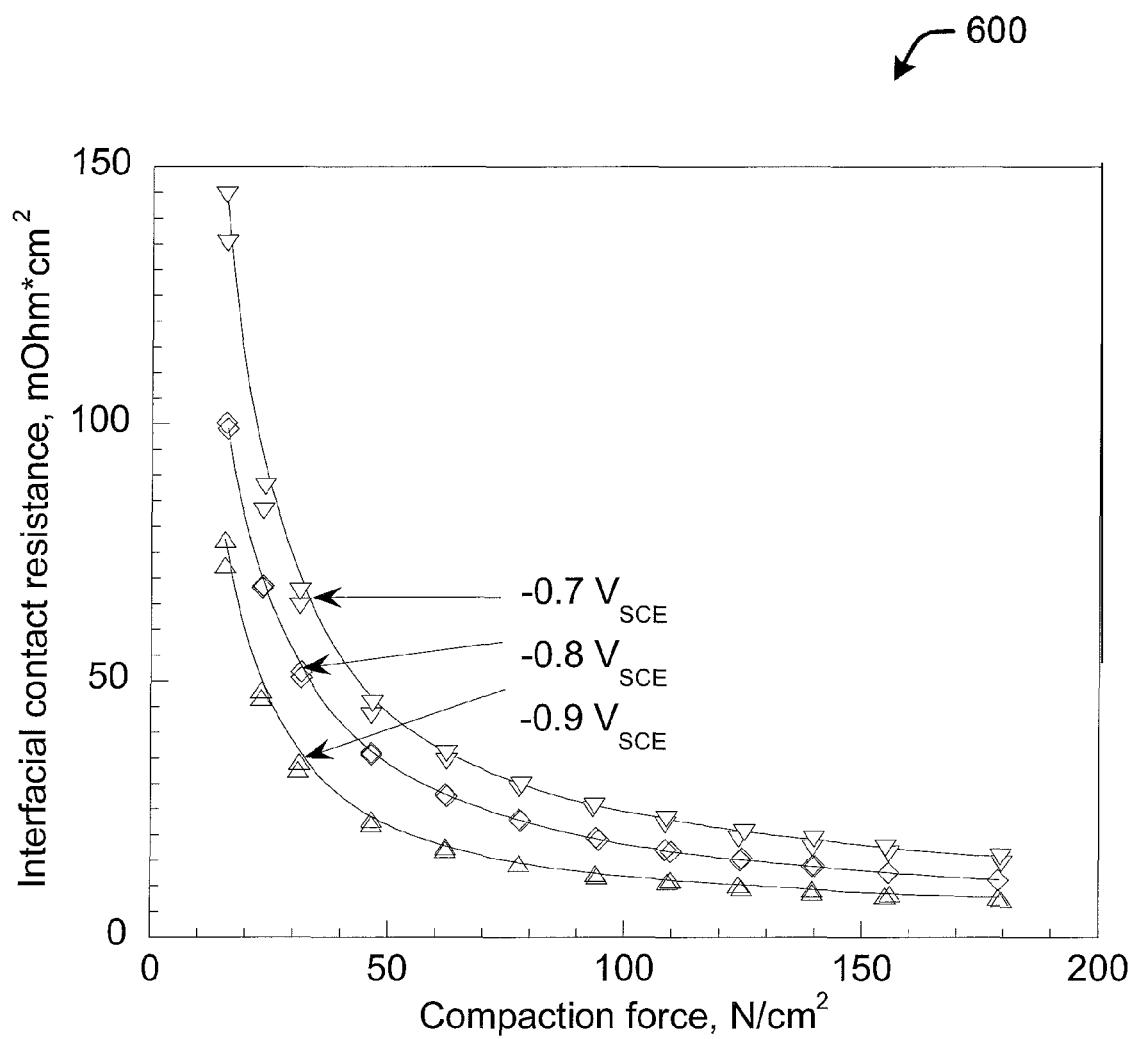
FIG. 6 is a plot of ICR versus compaction force and illustrates the influence of nitridation potential on the ICR of the electrochemically nitrided AISI446 steel. The processing time was about 4 h for all tests.
Figure 7:
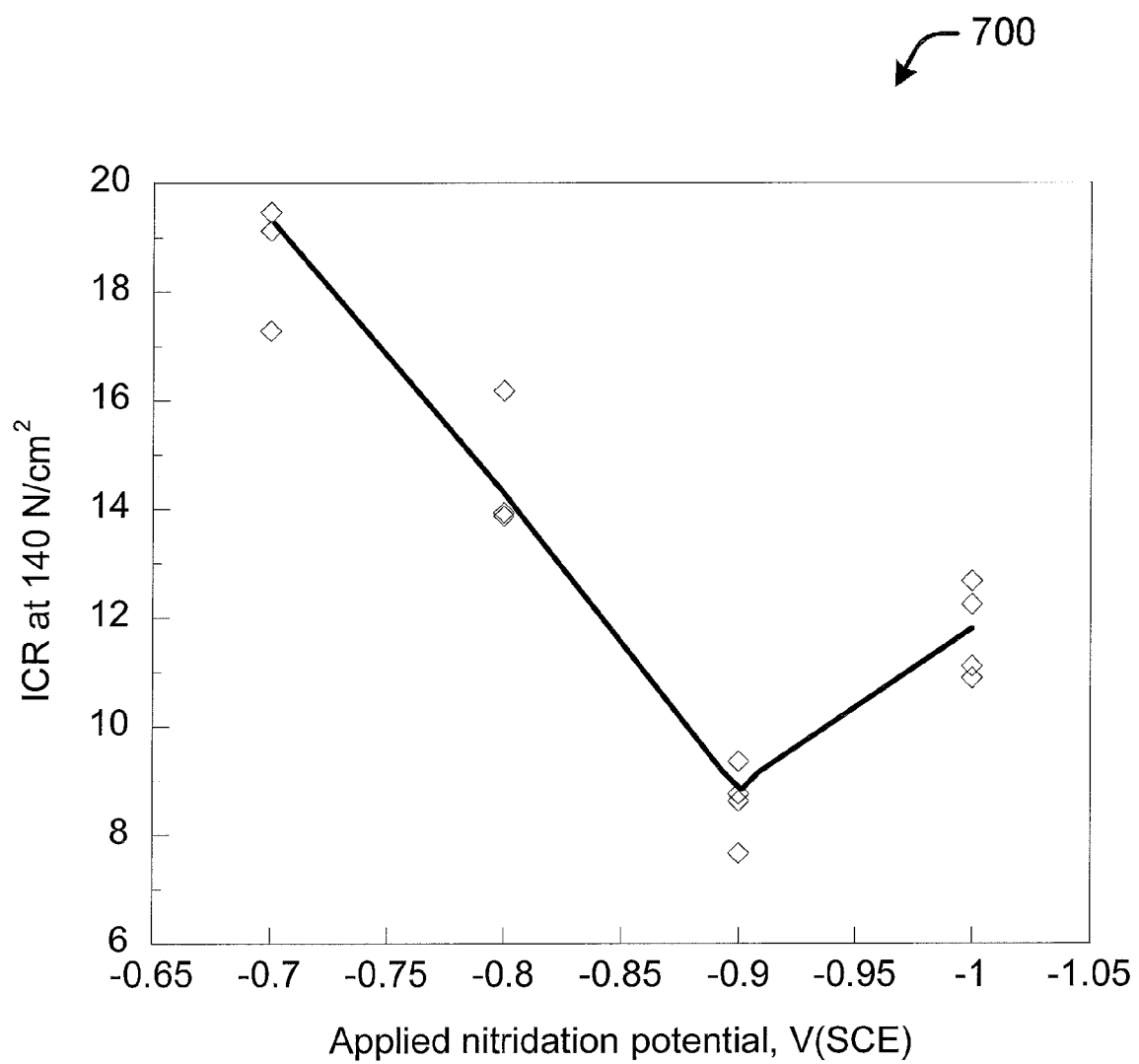
FIG. 7 shows the influence of applied potential during electrochemical nitridation on the ICR of AISI446 steel at compaction force of 140 N/cm$^2$. The processing time was about 4 h for all tests.

The influence of the applied potential on the ICR of the electrochemically nitrided AISI446 is shown in the plot 600, FIG. 6. As expected, more negative potential results in lower ICR values. When the steel is treated at −0.9 V, a target of 10 mΩ·cm$^2$ can be reached at compaction force of about 120 N/cm$^2$ and above. However, ICR for samples treated at −1 V increases back again, as shown in the plot 700 FIG. 7.

Figure 8:
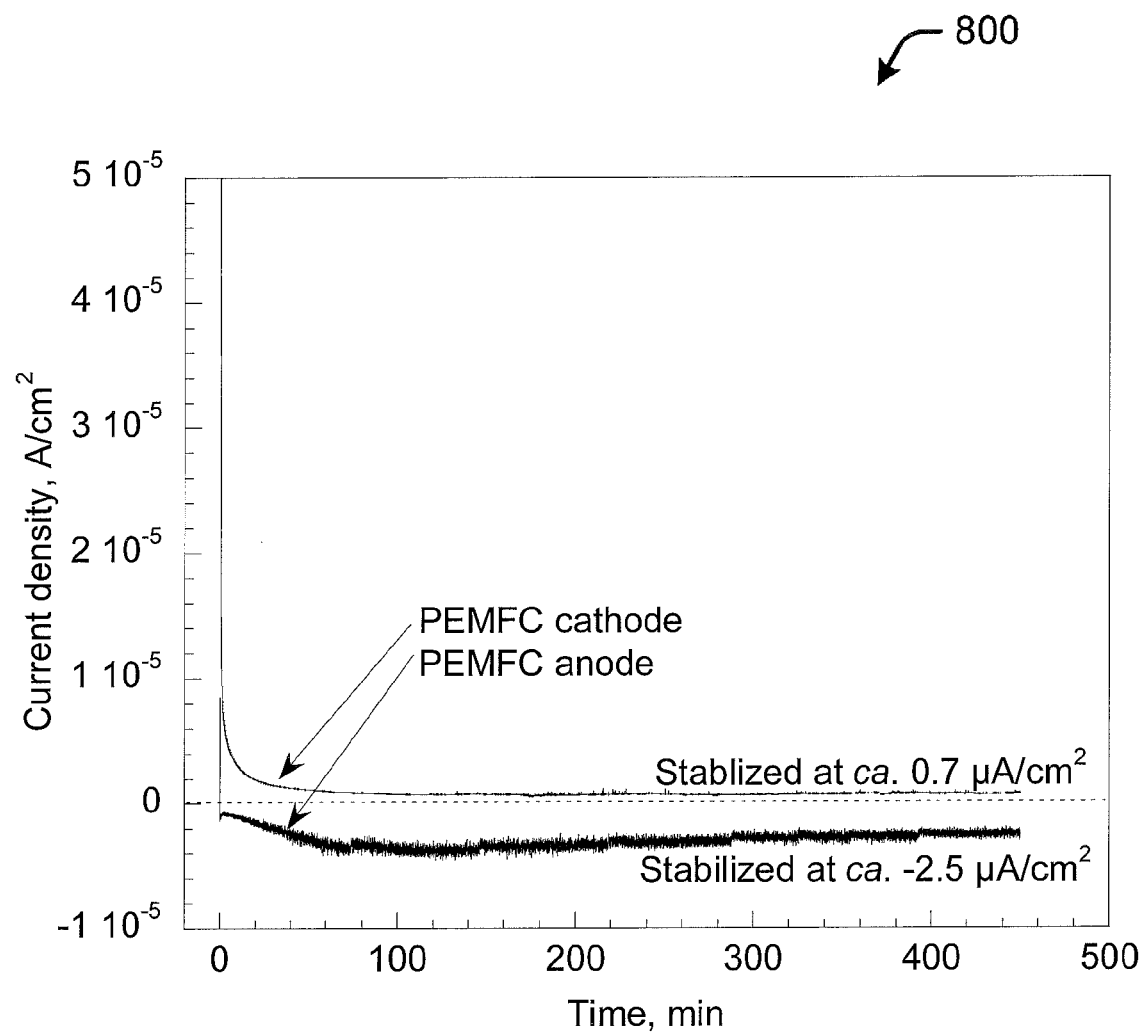
FIG. 8 is a plot of current density versus time and shows the anodic behavior of EN 446 steel in polymer electrode membrane fuel cell (PEMFC) anode and cathode environments. PEMFC anode: −0.1 V in 1 M $H_2SO_4$+2 ppm $F^-$ at 70° C., hydrogen gas purge; PEMFC cathode: 0.6 V in 1 M $H_2SO_4$+2 ppm at 70° C., air purge.

FIG. 8 shows a plot 800 of potentiostatic polarizations of the electrochemically nitrided AISI446 (−0.7 V) in simulated PEMFC environments. In the PEMFC anode condition (−0.1 V in hydrogen-purged solution), nitrided AISI446 steel shows cathodic current (negative) after the initial sharp current decay. This indicates that the electrode is cathodically protected. Thus the anodic dissolution may be eliminated, close to zero. Moreover, the current is very stable (about −2.5 μA/cm$^2$) and similar to the data for thermally nitrided AISI446. This, in turn, suggests the similarity of the surface layer with different processing methods. In PEMFC cathode environments, the anodic current reaches stable values in a very short period of time. The current is more stable than in the case of the PEMFC anode, and the stable current is about 0.7 μA/cm$^2$.

With such low currents in the aggressive simulated PEMFC environments, it is clear that the electrochemically nitrided AISI446 is very suitable for bipolar plate applications.

Figure 9:
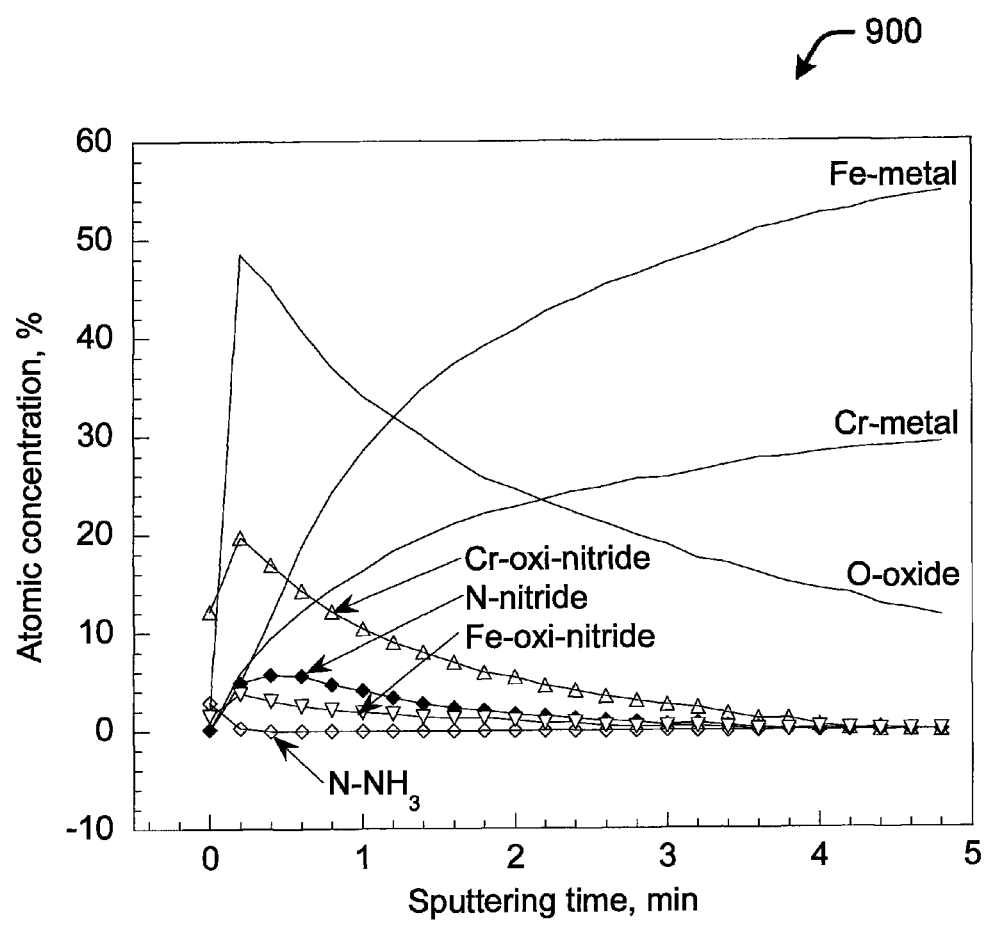
FIG. 9 is a plot of atomic concentration versus sputtering time and shows the X-ray photoelectron spectroscopy (XPS) depth profile for AISI446 steel electrochemically nitrided at −0.7V.

FIG. 9 is a plot 900 showing an XPS depth profile for as-nitrided AISI446 steel nitrided for about 4 h at −0.7 V. For simplification, only O, Fe, Cr and N are shown in the figure. Air-formed films on stainless steels are composed of Fe-rich outer layers and Cr-rich inner layers. After the electrochemical nitridation, however, the non-metal Fe-content is reduced, mostly by selective dissolution, and the Cr-oxy-nitride dominates the surface layer. The term "oxy-nitride" is used to describe the nitrogen-incorporated oxide film. Owing to the high stability of the oxides, it is natural that oxide is still the major part in the oxy-nitride. By using the half height of the oxygen in oxide (O-oxide) as an estimate of the oxide/substrate steel interface, the oxide layer is projected to be about 7.2 nm thick. With respect to FIG. 9, nitrogen is incorporated in the surface layer. Two forms of N are detected. One form comes from the outer layer with a binding energy level of 399.7 eV, while the other comes from the inner layer with a binding energy of 396.8 eV. They are both due to $NH_3$ and nitride, as marked in FIG. 9. Nitride formation is from the reduction of absorbed $NO_3$. Considering the binding energy value for CrN is at 397.2 eV, the peak at 396.8 eV indicates mixed nitrides. Surface ammonia was detected previously and was considered due to the reaction between the nitride and adsorbed water. FIG. 9 illustrates that the surface ammonia is easily sputtered off within a few rounds, indicating it is shallow. On the other hand, the nitrides penetrate much deeper into the substrate. If using the half-height of the nitride curve as the nitride/substrate boundary, it will need about 1.36 min to sputter off the nitride. Adopting a sputtering rate of 3.5 nm/min, the electrochemical nitride layer is estimated to be about 4.8 nm thick. This thin nitride layer significantly reduced the ICR as above.

Figure 10:
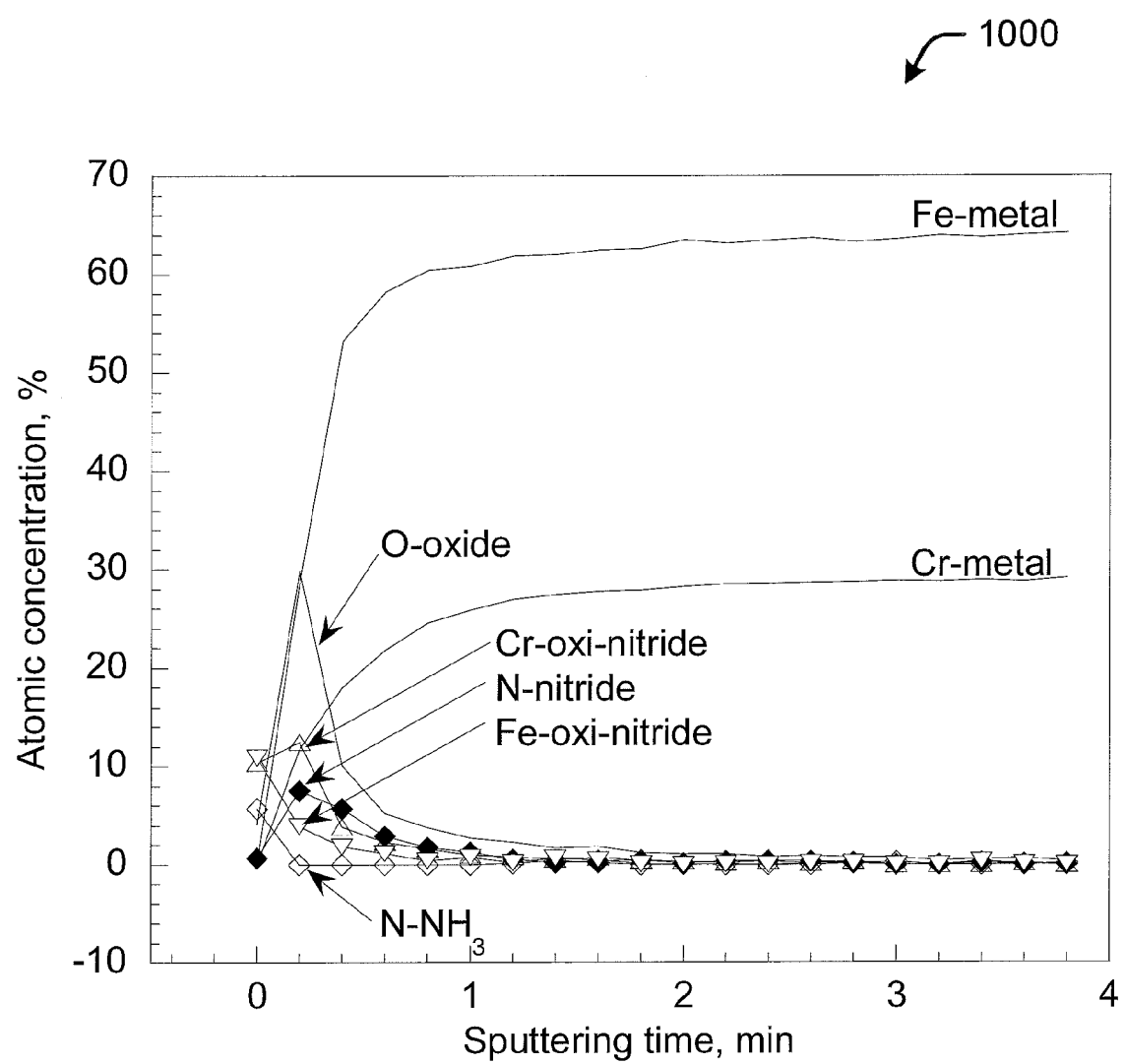
FIG. 10 is a plot of atomic concentration versus sputtering time and shows the XPS depth profiles for AISI446 steel electrochemically nitrided at −0.7V after polarization for 7.5 h in a PEMFC anode environment.

After the electrochemically nitrided AISI446 steel experienced polarization in the PEMFC environment, the surface condition changed. FIG. 10 is a plot 1000 illustrating the depth profile for the nitrided metal after 7.5 h polarization in a PEMFC anode environment. The surface layer becomes thinner after polarization, both oxides and nitrides. With a similar calculation, about 0.35 minutes may be used to sputter off oxides and about 0.54 min may be used to sputter off nitrides, corresponding to about 1.2 nm (nanometers) thick oxides and about 1.9 nm thick nitrides. FIG. 10 indicates that the electrochemical nitride layer is stable in PEMFC environments.

EXAMPLE

In this example, commercial grade Type AISI446 stainless steel, with a chemical composition of Fe-28Cr-3Ni-3.5Mo (weight %) was used and samples of 2.54×1.27 cm size were polished and cleaned. The electrochemical nitridation process was carried out by means of a Solartron 1287 potentiostat using a solution of 0.1 M $HNO_3$+0.5 M $KNO_3$ at room temperature. The nitric acid is employed to adjust the solution to a pH of 1. The pH of the electrochemical solution may be varied between 0 and 3 as needed. The electrochemical solution can be replaced with other $NO_3^-$ bearing solutions of $HNO_3$, $NaNO_3$, $NH_4NO_3$, $Mg(NO_3)_2$ or even other $NO_3^-$ bearing solutions known to those skilled in the art. A conventional three-electrode system, including a saturated calomel electrode (SCE) as reference and a platinum sheet as counter electrode, was employed. After stabilization at an open circuit potential (OCP) for 5 minutes, a cathodic potential was applied to the sample for a period of time. The applied potentials in this study were about −0.7 V to about −1 V. Samples after the electrochemical nitridation were characterized by X-ray photoelectron spectroscopy (XPS). This was carried out in a Phi 5600 electron spectrometer using Al Kα radiation X-ray source (1486.6 eV) and a hemispherical energy analyzer. The base pressure in the spectrometer chamber was about $1.33 \times 10^{-8}$ Pa. Depth profiles were obtained by sputtering the samples with 3 keV argon ions. During the sputtering process, the pressure in the chamber was about $6.67 \times 10^{-5}$ Pa. Based on the operating parameters, the sputtering rate was estimated to be about 35 Å/min (angstroms per minute)

According to the potential range and the electrolyte used, the hydrogen evolution reaction is one of the important reactions on the steel's surface. This gas evolution was noticed in the nitridation process. Therefore, part of the current registered in the nitridation process is related to the hydrogen evolution. However, the nitrate is electrochemically reducible in this potential range and reduction to atomic nitrogen is possible. At the potential range in nitrate-bearing electrolyte, $NO_3^-$ can adsorb on the metal's surface (Equation 1). The reduction of the absorbed $NO_3^-$ results in ammonia and metal nitride (Equations 2-3). The mechanism can be described in the following chemical reactions:

$$M + NO_3^- \rightarrow NO_{3\ ads}^- M \quad (1)$$

$$NO_{3\ ads}^- M + 6H^+ + 8e \rightarrow NM + 3H_2O \quad (2)$$

Figure 11:
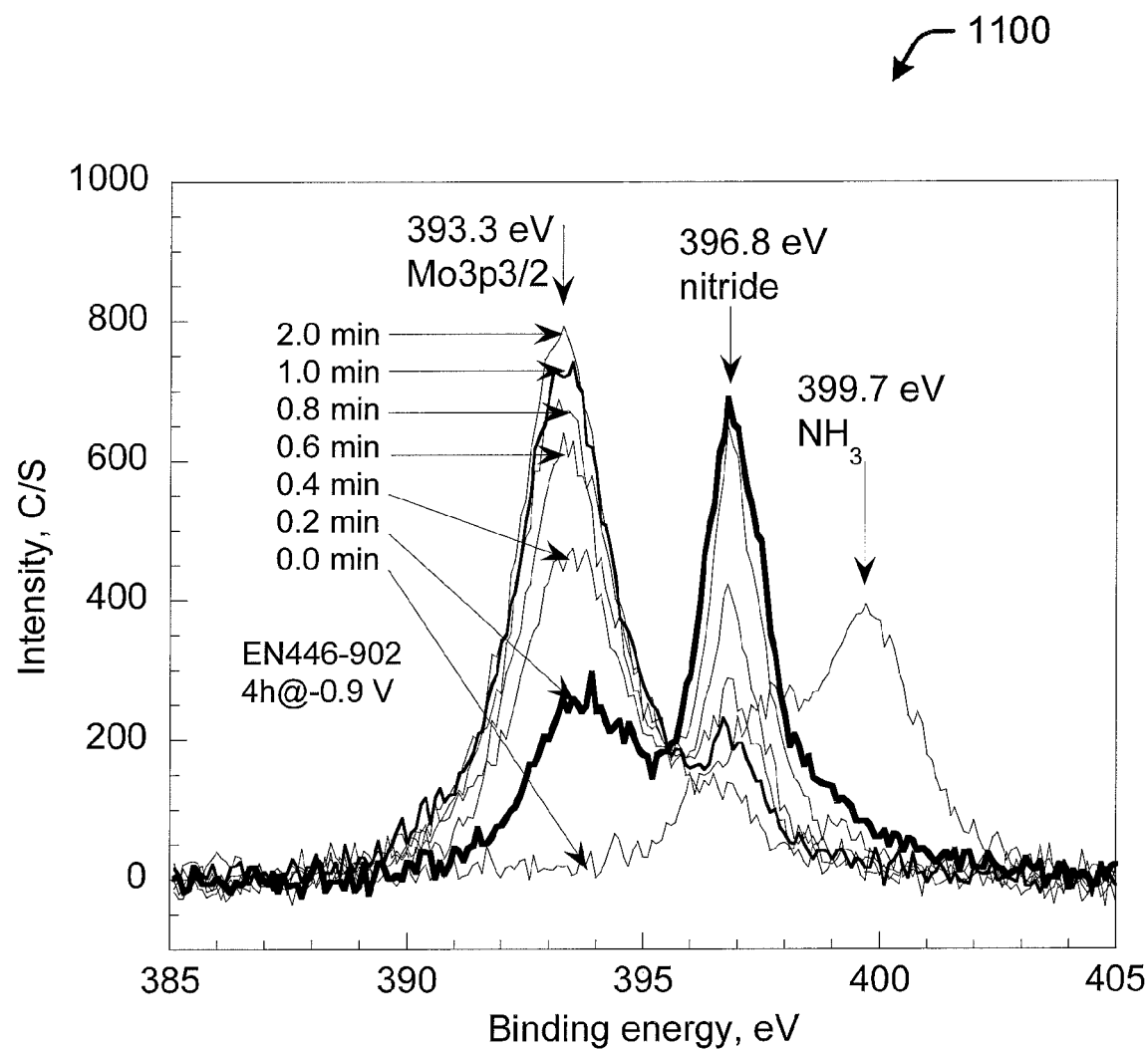
FIG. 11 is a plot of intensity versus binding energy and shows the changes of the N1s X-ray photoelectron spectrum with sputtering time for AISI446 steel electrochemically nitrided at −0.9 V. The sputtering time is delineated for each curve.

$$NO_3^- + 10H^+ + 8e \rightarrow 3H_2O + NH_4^+ \quad (3)$$

Where $NO_{3\ ads}^- M$ stands for the adsorbed nitrate and NM for metal nitride. An XPS profile identified the reduction of nitrate. FIG. 11 is a plot 1100 of the XPS N1s and Mo3p3/2 spectra for AISI446 steel electrochemically nitrided for 4 h at −0.9 V. Nitrogen in the steel exists in two forms. The peak at 399.7 eV is assigned to the $NH_3$, which is in agreement with previous reported binding energies of 399.4~400.0 eV for $NH_3$. $NH_3$ is at the outermost surface, since a slight sputtering can diminish the peak. The peak at about 396.8 eV (electron volts) is assigned to nitrides, in agreement with a binding energy of about 396.5 to 397.2 eV for nitrides. Following the sputtering procedure, the nitride peak at 396.8 eV decays, with the increasing intensity of Mo3p3/2 peak. After about 2 minutes of sputtering, the intensity for the nitride peak at 396.8 eV is already rather small. This indicates that the nitrides are still rather shallow and mostly incorporated with oxides. The nitrogen incorporation into the oxide film was due to a high cathodic charge applied. Considering the binding energy value for CrN is at about 396.3 to 396.6 eV and that for $Cr_2N$ is at about 397.1 to 397.6 eV, the peak at about 396.8 eV is an indication of mixed nitrides.

Figure 12:
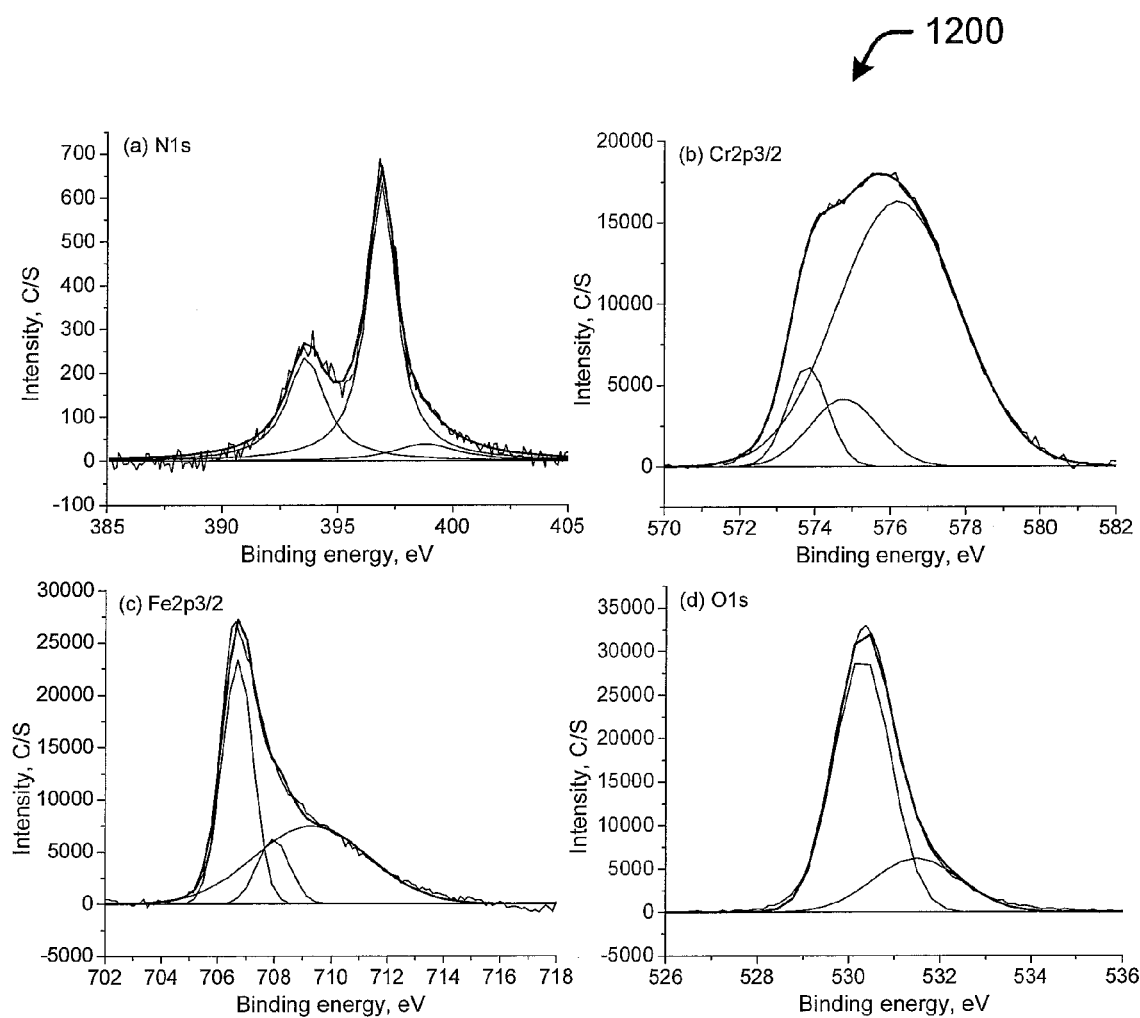
FIG. 12 contains four plots (a), (b), (c), and (d) of intensity versus binding energy and shows XPS spectra of electrochemically nitrided AISI446 steel at about −0.9V for 4 h. (a) N1s; (b) Cr2p3/2; (c) Fe2p3/2; and (d) O1s.

The plot 1200 in FIG. 12 shows the XPS spectra for N (12a), Cr (12b), Fe (12c) and O (12d) after removing the outermost surface substance by sputtering. Plot 12(a) gives the N1s XPS spectrum. Clearly, there are two major peaks and one minor peak present. One major peak comes from the nitrides with a binding energy level of about 396.8 eV, while the other major comes from Mo3p3/2. The minor peak at about 399.7 eV represents surface absorbed $NH_3$. FIG. 12(b) shows the Cr2p XPS spectrum for the nitrided AISI446 steel. The large peak at about 576.2 eV is assigned to the Cr—O bond, corresponding to $Cr_2O_3$. The peak at about 573.8 eV is the metal Cr peak. This peak increases with sputtering (not shown). Plot 12(b) reveals a new chromium compound located at the binding energy of about 574.8 eV, which is not seen on the ordinary passive film of stainless steel. On the other hand, nitrided stainless steel has a Cr—N peak at about 574.6 to 575.2 eV, depending on the substrate material and the nitridation conditions. This peak decreases with sputtering, in agreement with the N is nitride peak. Thus, the smaller peak at 574.8 eV is due to Cr—N bond resulting from the electrochemical nitridation. Combined with the N1s peak, this peak represents the mixed nitrides. The ratio between the fitted curves for the oxides and nitrides is roughly 7:1. Therefore, nitrides have a much lower quantity than the oxides, indicating the surface film is nitrogen incorporated oxide, with the oxide dominating.

Plot 12(c) shows the Fe2p XPS spectrum for nitrided AISI446 stainless steel. The broad peak at about 709.3 eV is assigned to $Fe^{2+}/Fe^{3+}$, with $Fe^{2+}$ having a major part due to its lower binding energy level. In other words, $Fe^{2+}/Fe^{3+}$ reduction was preferred at surface during the nitridation process since the potential is cathodic. Another peak at about 706.7 eV is assigned to the metal Fe. A small peak at about 708.0 eV is related to the Fe—N bond. Fe—N compounds are commonly in co-existence with the chromium nitrides in nitrided steels. However, Fe—N compounds usually have minor contributions compared to Cr—N compounds. From curve fitting analyses in Plot 12(c), the oxide area is about 4.2 times that of the nitride area. The O1s XPS spectrum in Plot 12(d) is relatively simple. The peak at about 530.3 eV is assigned to the metal oxides. The small peak at about 531.5 eV is due to unavoidable residual surface hydroxide having a binding energy of about 531.4 to 531.8 eV.

Figure 13:
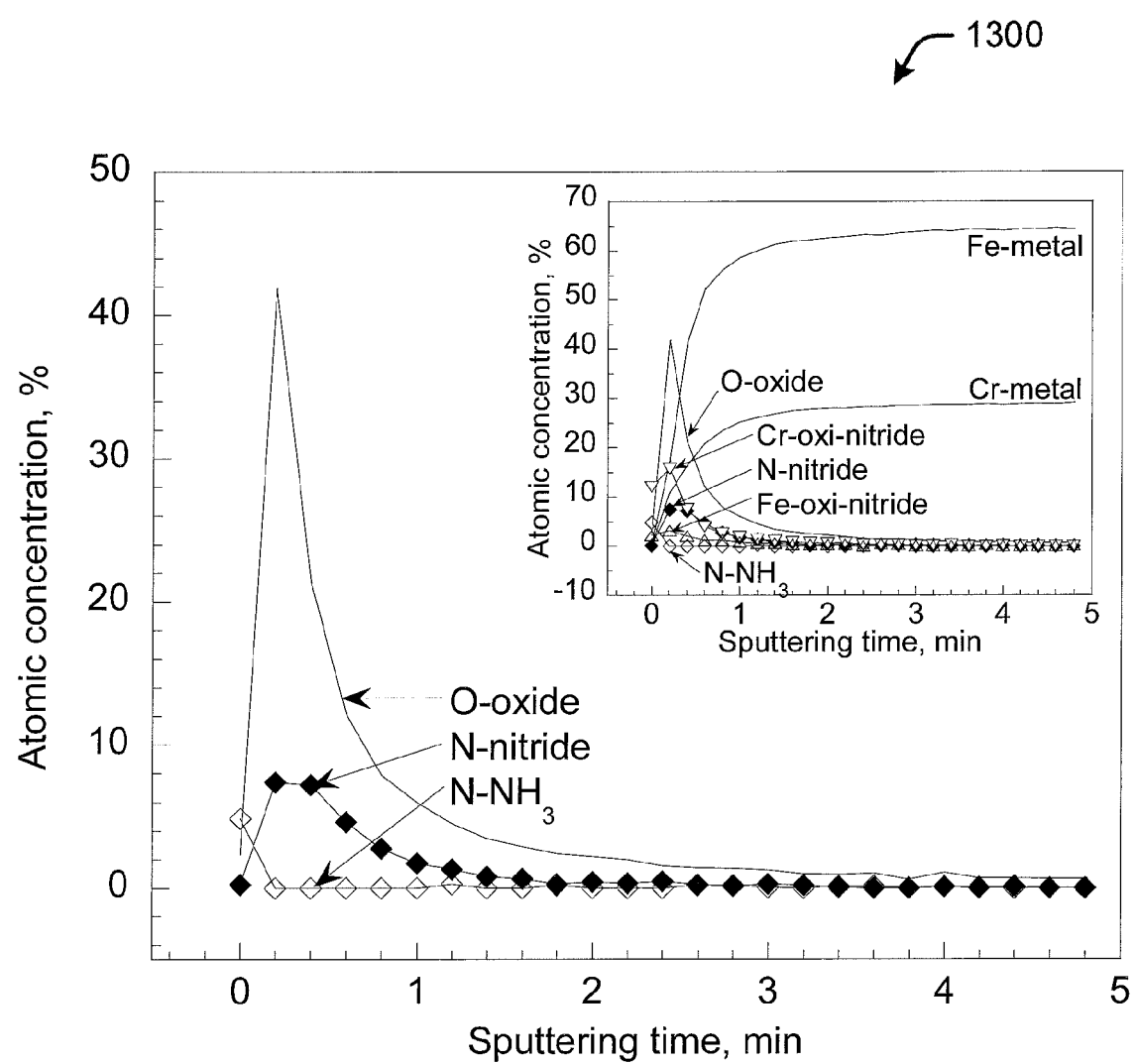
FIG. 13 is a plot of atomic concentration versus sputtering time and shows the XPS depth profile for electrochemically nitrided AISI446 steel. Nitridation was carried out for about 4 h at about −0.9 V.

FIG. 13 is a plot 1300 of the XPS depth profiles for oxide, nitride and surface ammonia for as-nitrided AISI446 stainless steel. Due to the high stability of the oxides, oxides are still the major component in the film. The surface nature of $NH_3$ is illustrated. The surface ammonia is sputtered of in a few rounds, indicating it is shallow in nature. Nitrides penetrate deeply into the film, matching with the surface oxide film thickness and illustrating the incorporation of nitrogen into surface oxide film. So the surface film is composed of nitrogen incorporated oxides. By using the half height of the nitride curve as the nitride/substrate boundary, about 0.7 min is used to sputter off the nitride. In this respect using a sputtering rate of 3.5 nm/min, the electrochemical nitride layer is estimated to be about 2.5 nm thick.

The inset of FIG. 13 gives the XPS depth profiles for O, Fe, Cr and N. Air-formed films on stainless steels are composed of an Fe-rich outer layer and an Cr-rich inner layer. After electrochemical nitridation, the non-metal Fe-compound content is significantly reduced, mostly by selective dissolution, and the non-metal Cr-compound dominates the surface layer. The term oxy-nitride represents the nitrogen incorporated oxides.

It is noted that the example discussed above is provided for purposes of illustration and is not intended to be limiting. Still other embodiments and modifications are also contemplated.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:

1. A method of electrochemical nitridation of a metal, the method comprising:
providing a potentiostat system comprising a potentiostat, a counter electrode, a reference electrode, and a working electrode comprising the metal;
immersing the working electrode, the counter electrode, and the reference electrode in a solution, wherein the solution consists of nitric acid and at least one nitrate; and
applying a cathodic potential, whereby the metal is nitrided with a nitride surface layer.

2. The method of claim 1, wherein the metal comprises a self-passivating metal.

3. The method of claim 2, wherein the self-passivating metal comprises at least one of Cr, Al, Fe, or Ti.

4. The method of claim 1, further comprising stabilizing the potentiostat system at an open circuit potential, wherein the stabilizing occurs before applying the cathodic potential, and occurs for less than about 10 minutes.

5. The method of claim 4, wherein the stabilizing is performed for about 5 minutes.

6. The method of claim 1, wherein the cathodic potential ranges from about −0.7V to about −1V.

7. The method of claim 6, wherein the applying the cathodic potential is performed for a period of time ranging from about 0.5 to about 8 hours.

8. The method of claim 1, wherein the immersing in the solution is performed at a temperature ranging from about 0° C. to about 100° C.

9. The method of claim 1, wherein the reference electrode comprises a saturated calomel electrode.

10. The method of claim 1, wherein the nitric acid has a concentration of about 0.1 M and the at least one nitrate is at a concentration of about 0.5 M.

11. The method of claim 1, wherein the at least one nitrate is at least one of $NaNO_3$, $NH_4NO_3$, or $Mg(NO_3)_2$.

12. The method of claim 1, wherein the solution has a pH ranging from about 0 to about 3.

13. The method of claim 1, wherein the applying the cathodic potential is performed for a period of time ranging from about 0.5 hours to about 8 hours.

14. The method of claim 1, wherein the cathodic potential is applied until the nitride surface layer ranges in thickness from about 2 nm to about 5 nm.

15. A method of electrochemical nitridation of a metal, the method comprising:
providing a potentiostat system comprising a potentiostat, a working electrode comprising the metal, a platinum counter electrode, and a reference electrode comprising a saturated calomel electrode, wherein the metal comprises at least one of Cr, Al, Fe, or Ti;
immersing the working electrode, the counter electrode, and the reference electrode in a solution at a temperature ranging from about 0° C. to about 100° C., wherein the solution consists of nitric acid and at least one of $NaNO_3$, $NH_4NO_3$, or $Mg(NO3)_2$, and the solution is adjusted to a pH ranging from about zero to three;
stabilizing the potentiostat system at an open circuit potential for a first period of time ranging from about 30 seconds to about 10 minutes; and
applying a cathodic potential ranging from about −0.7V to about −1V for a second period of time ranging from about 0.5 hours to about 8 hours, whereby the metal is nitrided with a nitride surface layer ranging in thickness from about 2 nm to about 5 nm.

* * * * *